United States Patent
An et al.

(10) Patent No.: US 10,608,221 B2
(45) Date of Patent: Mar. 31, 2020

(54) BATTERY PACK AND VEHICLE INCLUDING BATTERY PACK

(71) Applicant: LG Chem, Ltd., Seoul (KR)

(72) Inventors: Hyuk An, Daejeon (KR); Jun-Kyu Park, Daejeon (KR); Young-Sop Eom, Daejeon (KR); Jun-Yeob Seong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 61 days.

(21) Appl. No.: 15/781,270

(22) PCT Filed: Jul. 28, 2017

(86) PCT No.: PCT/KR2017/008190
§ 371 (c)(1),
(2) Date: Jun. 4, 2018

(87) PCT Pub. No.: WO2018/052189
PCT Pub. Date: Mar. 22, 2018

(65) Prior Publication Data
US 2018/0366698 A1    Dec. 20, 2018

(30) Foreign Application Priority Data

Sep. 19, 2016 (KR) .................. 10-2016-0119290

(51) Int. Cl.
*H01M 2/10* (2006.01)
(52) U.S. Cl.
CPC ....... *H01M 2/1077* (2013.01); *H01M 2/1083* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2012/0145483 | A1 | 6/2012 | Araki |
| 2012/0282516 | A1 | 11/2012 | Kim |
| 2014/0315070 | A1 | 10/2014 | Park et al. |
| 2015/0222131 | A1 | 8/2015 | Kano |
| 2017/0200925 | A1 | 7/2017 | Seo et al. |
| 2017/0244143 | A1 | 8/2017 | Burgers et al. |
| 2018/0175348 | A1 | 6/2018 | Sugeno et al. |

FOREIGN PATENT DOCUMENTS

| | | |
|---|---|---|
| JP | S53-46661 U | 4/1978 |
| JP | 2000-311668 A | 11/2000 |
| JP | 2000-340196 A | 12/2000 |
| JP | 2003-249775 A | 9/2003 |
| JP | 2012-064492 A | 3/2012 |
| JP | 2013-130742 A | 7/2013 |

(Continued)

OTHER PUBLICATIONS

International Search Report and Written Opinion for Application No. PCT/KR2017/008190, dated Nov. 23, 2017 (11 Pages).

*Primary Examiner* — Wyatt P McConnell
(74) *Attorney, Agent, or Firm* — Morgan, Lewis & Bockius LLP

(57) ABSTRACT

Disclosed is a battery pack, which includes a battery module including at least one battery cell and having at least one insert hole at a bottom thereof, and a pack case having an accommodation space for accommodating the battery module and having at least one fixing protrusion which is fitted into the at least one insert hole.

10 Claims, 5 Drawing Sheets

(56) References Cited

FOREIGN PATENT DOCUMENTS

| | | |
|---|---|---|
| JP | 2013-543239 A | 11/2013 |
| JP | 2014-160551 A | 9/2014 |
| JP | 2015-011956 A | 1/2015 |
| JP | 2015-138589 A | 7/2015 |
| JP | 2015-138590 A | 7/2015 |
| KR | 10-2012-0030011 A | 3/2012 |
| KR | 10-2014-0124720 A | 10/2014 |
| KR | 10-2015-0138626 A | 12/2015 |
| KR | 10-2016-0012021 A | 2/2016 |
| WO | 2011/013647 A1 | 2/2011 |

BATTERY PACK AND VEHICLE INCLUDING BATTERY PACK

TECHNICAL FIELD

The present disclosure relates to a battery pack, and a vehicle including the battery pack.

The present application claims priority to Korean Patent Application No. 10-2016-0119290 filed on Sep. 19, 2016 in the Republic of Korea, the disclosure of which is incorporated herein by reference.

BACKGROUND

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

A conventional battery pack generally includes a battery module and a pack case for accommodating the battery module to package the battery module. Here, the battery module may be mounted to be fixed in the pack case in order to prevent vibrations and impacts. For the fixation, in the conventional battery pack, the battery module is fixed in the pack case by using an additional coupling structure with bolts, nuts or the like.

However, the coupling structure using bolts, nuts or the like inevitably demands an additional coupling space in the pack case, which may be highly likely to cause a limitation in space inside the pack case. Also, even though the coupling space is secured, it is difficult to ensure a space for connecting the battery module and the pack case.

For ensuring such a space, the pack case should have a great size, but the increase in the size of the pack case runs counter to a slimmer structure according to the recent slimming trend.

Thus, it is demanded to develop a battery pack which may implement a slimmer structure according to the recent slimming trend and stably fix a battery module in the pack case, and a vehicle including the battery pack.

SUMMARY

The present disclosure is designed to solve the problems of the related art, and therefore the present disclosure is directed to providing a battery pack which may implement a slimmer structure according to the recent slimming trend and stably fix a battery module in the pack case, and a vehicle including the battery pack.

In one aspect of the present disclosure, there is provided a battery pack, comprising: a battery module including at least one battery cell and having at least one insert hole at a bottom thereof; and a pack case having an accommodation space for accommodating the battery module and having at least one fixing protrusion which is fitted into the at least one insert hole.

The at least one fixing protrusion may be provided at a bottom of the accommodation space, and at least a part of the at least one fixing protrusion may be permanently deformed partially when being fitted into the at least one insert hole.

The at least one fixing protrusion may include: a main rib protruding upwards from an inner wall of the pack case; and a deformable rib provided at an outer side of the main rib and permanently deformed when being fitted into the insert hole.

The deformable rib may be provided in plural, and the plurality of deformable ribs may be disposed to be spaced apart from each other at predetermined intervals along a circumferential direction of the main rib.

The plurality of deformable ribs may be arranged in a cross form along the circumferential direction of the main rib.

An outer diameter of the main rib may be smaller than an inner diameter of the insert hole.

When the fixing protrusion is fitted into the insert hole, the deformable rib may be deformed in at least one of horizontal and vertical directions of the battery module to fill a gap between the main rib and the insert hole.

The deformable rib may be elongated along a length direction of the main rib.

The main rib may have a circular or oval section.

The insert hole may be provided in plural, and the fixing protrusion may be provided in a number corresponding to the number of the plurality of insert holes.

In addition, the present disclosure provides a vehicle comprising: a battery pack according to the above embodiments.

According to the various embodiments as above, it is possible to provide a battery pack which may implement a slimmer structure according to the recent slimming trend and stably fix a battery module in the pack case, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
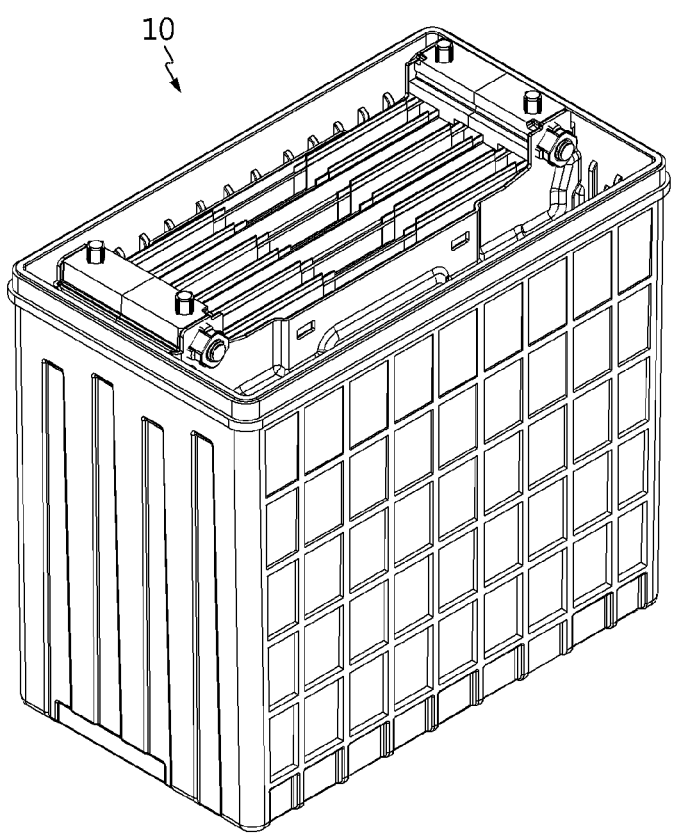
FIG. 1 is a diagram for illustrating a battery pack according to an embodiment of the present disclosure.

FIG. 1 is a diagram for illustrating a battery pack according to an embodiment of the present disclosure.

Referring to FIG. 1, a battery pack 10 may be provided as a fuel source of the vehicle. As an example, the battery pack 10 may be provided to an electric vehicle, a hybrid vehicle, a plug-in hybrid vehicle, and various other-type vehicles capable of using the battery pack 10 as a fuel source.

In addition, the battery pack 10 may be provided in other devices, instruments or facilities such as an energy storage system using a battery cell as a secondary battery, in addition to the vehicle.

Hereinafter, the battery pack 10 of this embodiment will be described in detail.

Figure 2:
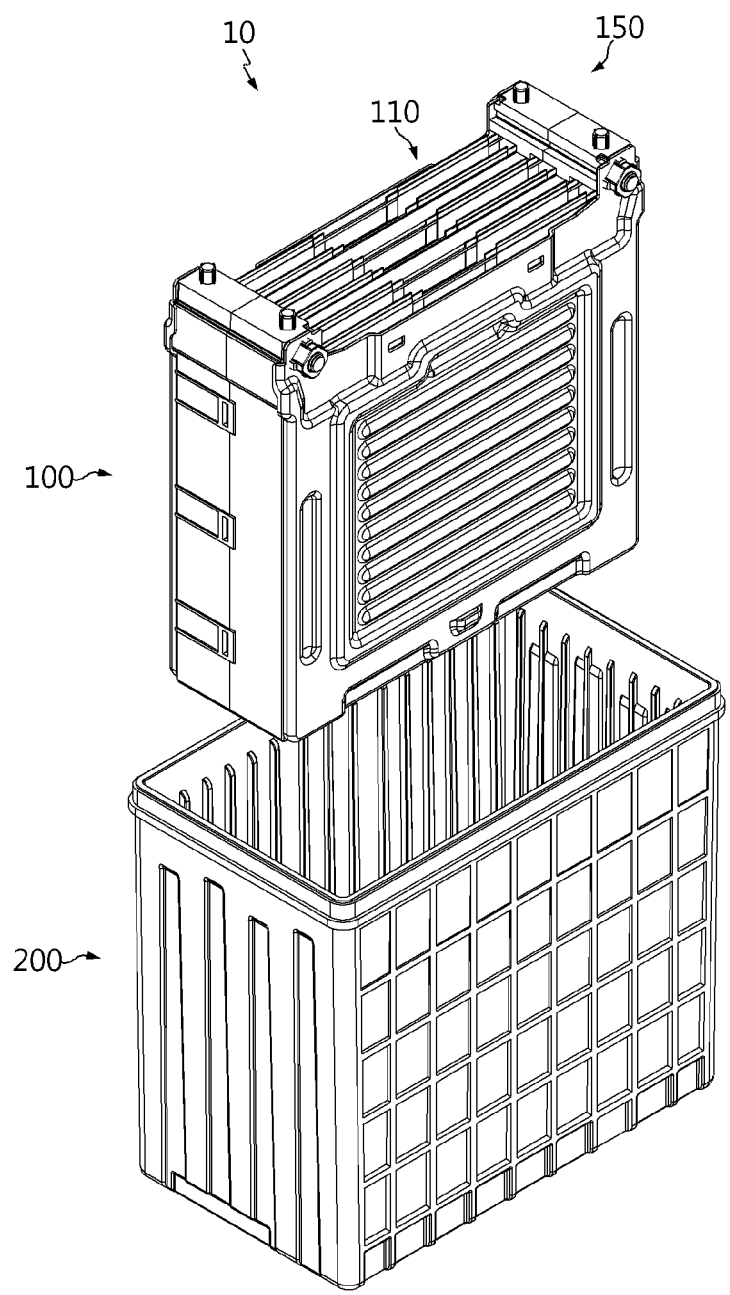
FIGS. 2 and 3 are exploded perspective view showing the battery pack of FIG. 1.
Figure 3:
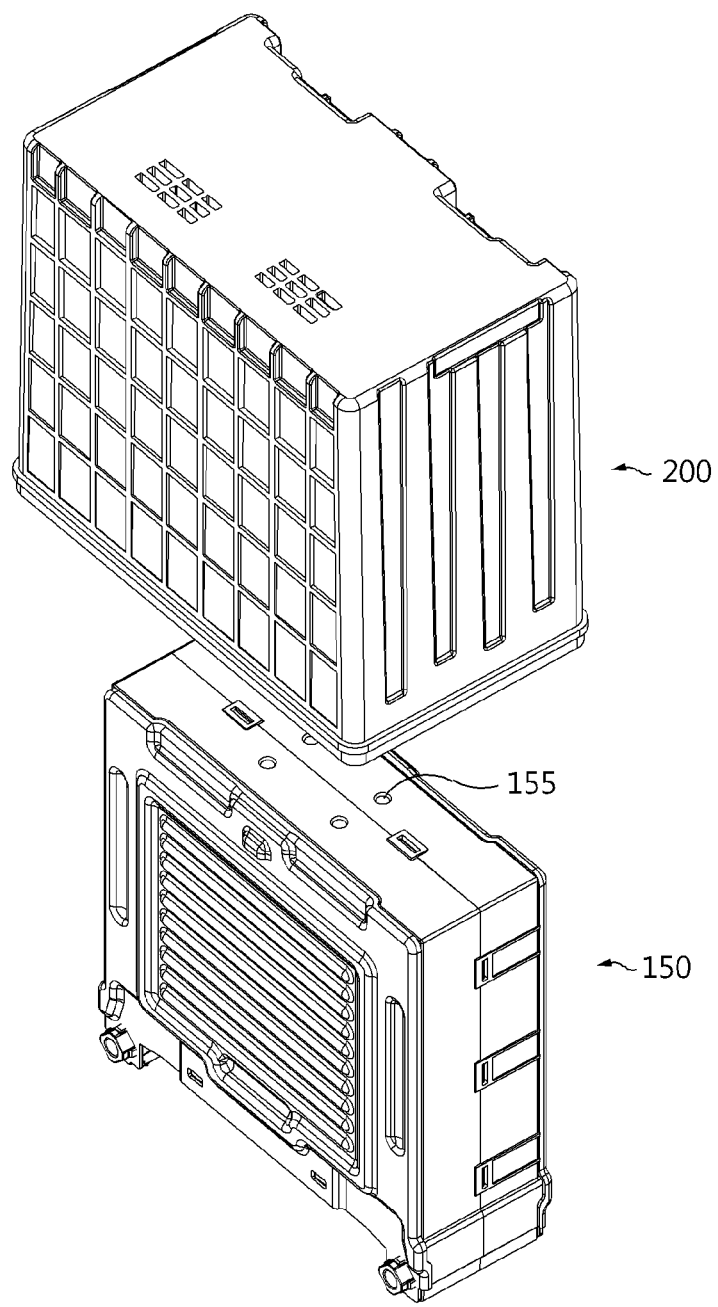
Figure 4:
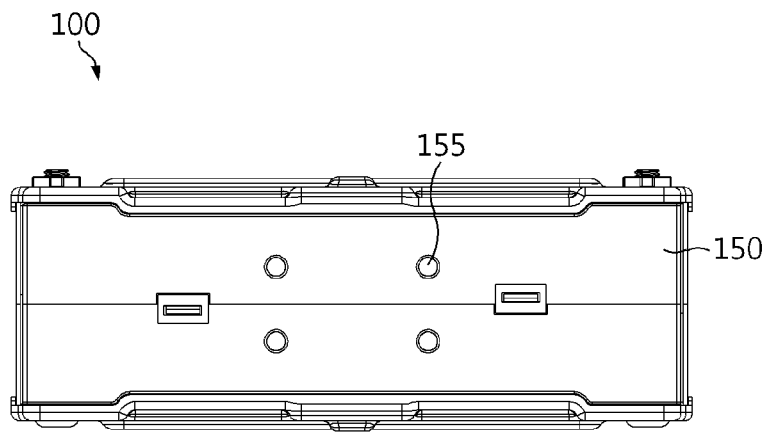
FIG. 4 is a bottom view showing the battery module of FIG. 3.
Figure 5:
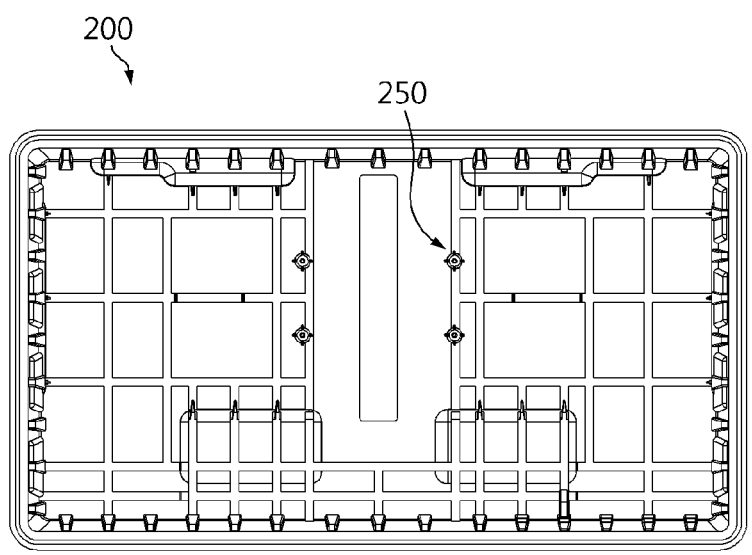
FIG. 5 is a plane view showing a pack case of the battery pack of FIG. 2.
Figure 6:
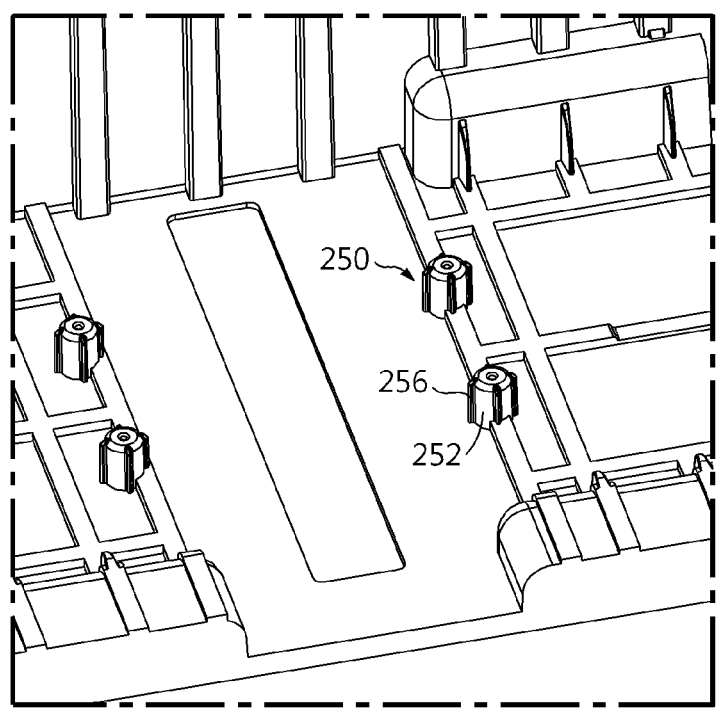
FIG. 6 is a diagram for illustrating a fixing protrusion of the pack case of FIG. 5.

FIGS. 2 and 3 are exploded perspective view showing the battery pack of FIG. 1, FIG. 4 is a bottom view showing the battery module of FIG. 3, FIG. 5 is a plane view showing a pack case of the battery pack of FIG. 2, and FIG. 6 is a diagram for illustrating a fixing protrusion of the pack case of FIG. 5.

Referring to FIGS. 2 to 6, the battery pack 10 may include a battery module 100 and a pack case 200.

The battery module 100 may include a battery cell 110 and a module case 150.

At least one battery cell 110 may be provided, and if a plurality of battery cells are provided, the battery cells may be stacked to be electrically connected to each other. Hereinafter, this embodiment will be described based on the case where a plurality of battery cells 110 are provided.

The plurality of battery cells 110 may be secondary batteries. Hereinafter, this embodiment will be described based on the case where the battery cells are secondary batteries, particularly pouch-type secondary batteries. The pouch-type secondary battery is well known in the art and thus is not described in detail here.

The module case 150 is used for accommodating the plurality of battery cells 110 and may accommodate and stably fix the plurality of battery cells 110.

The module case 150 may have an insert hole 155 formed therein.

The insert hole 155 may be provided at a bottom of the module case 150. It is possible that a plurality of insert holes 155 are provided. The plurality of insert holes 155 are disposed near the center of the bottom of the module case 150, and in detail, the plurality of insert holes 155 may be disposed symmetrically based on the center of the bottom of the module case 150.

The pack case 200 is used for packaging the battery module 100, and for this, the pack case 200 may have an accommodation space for accommodating the battery module 100.

The pack case 200 may have a fixing protrusion 250.

The fixing protrusion 250 is used for stably fixing the battery module 100 in the pack case 200 and may be provided at a bottom of the accommodation space in the pack case 200.

The fixing protrusion 250 may be inserted into the plurality of insert holes 155, and the fixing protrusion 250 may be provided in a number corresponding to the number of the plurality of insert holes 155. In other words, in this embodiment, a plurality of fixing protrusions 250 may be provided corresponding to the number of the plurality of insert holes 155.

The plurality of fixing protrusions 250 may be fitted into the plurality of insert holes 155, respectively. Here, when being fitted into the plurality of insert holes 155, at least a part of the plurality of fixing protrusions 250 may be permanently deformed partially.

This partial permanent deformation may allow the fixing protrusion 250 to solve an assembly tolerance or fill a gap, which may occur when the fixing protrusion 250 is inserted into the insert hole 155. Accordingly, the plurality of fixing protrusions 250 may be completely fixed in the insert hole 155 without shaking.

Each of the plurality of fixing protrusions 250 may include a main rib 252 and a deformable rib 256.

The main rib 252 may protrude upwards from an inner wall of the bottom of the pack case 200. The main rib 252 may have a circular or oval section for easier insertion and may be formed smaller than the inner diameter of the insert hole 155.

The deformable rib 256 may be permanently deformed when being inserted into the insert hole 155. In other words, the partial permanent deformation of the plurality of fixing protrusions 250 may mean the permanent deformation of the deformable rib 256.

In detail, when the fixing protrusion 250 is inserted into the insert hole 155, the deformable rib 256 may be permanently deformed in at least one of horizontal and vertical directions of the battery module 100 to fill a gap or assembly tolerance between the main rib 252 and the insert hole 155.

The deformable rib 256 may be provided at an outer side of the main rib 252 and be elongated along the length direction of the main rib 252. The deformable rib 256 may also have other shapes or arrangements as long as the gap or assembly tolerance between the main rib 252 and the insert hole 155 can be filled, without being limited to the above.

The deformable rib 256 may be provided in plural, and the plurality of deformable ribs 256 may be disposed to be spaced apart from each other at predetermined intervals along a circumferential direction of the main rib 252. In detail, the plurality of deformable ribs 256 may be arranged in a cross form based on the main rib 252 along the circumferential direction of the main rib 252. By this arrangement, when being permanently deformed, the plurality of deformable ribs 256 are permanently deformed at four points in a cross arrangement in the insert hole 155, which may ensure firmer fixation of the fixing protrusion 250 in the insert hole 155.

As described above, the battery pack 10 of this embodiment may stably fix the battery module 100 in the pack case 200 by means of the coupling structure where the fixing protrusion 250 is fitted into the insert hole 155.

Accordingly, in the battery pack 10 of this embodiment, it is possible to prevent the battery module 100 from being shaken in the pack case 200 due to vibrations or impacts.

In addition, in the battery pack 10 of this embodiment, a conventional additional coupling structure using bolts, nuts or the like is not required for fixing the battery module 100 in the pack case 200, and thus the battery pack 10 may have a slimmer structure. Also, the manufacture cost and the manufacturing efficiency may be greatly improved since the additional coupling structure is excluded.

Thus, the battery pack 10 of this embodiment may stably fix the battery module 100 in the pack case 200 while implementing a slimmer structure according to the recent slimming trend.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, comprising:
    a battery module including at least one battery cell and having at least one insert hole at a bottom thereof; and
    a pack case having an accommodation space for accommodating the battery module and having at least one fixing protrusion which is fitted into the at least one insert hole,
    wherein the at least one fixing protrusion includes:
        a main rib protruding upwards from an inner wall of the pack case; and
        a deformable rib provided at an outer side of the main rib and configured to be permanently deformed when being fitted into the insert hole.

2. The battery pack according to claim 1,
wherein the at least one fixing protrusion is provided at a bottom of the accommodation space, and at least the deformable rib of the at least one fixing protrusion is permanently deformed when being fitted into the at least one insert hole.

3. The battery pack according to claim 2,
wherein the deformable rib is provided in plural, and
wherein the plurality of deformable ribs are disposed to be spaced apart from each other at predetermined intervals along a circumferential direction of the main rib.

4. The battery pack according to claim 3,
wherein the plurality of deformable ribs are arranged in a cross form along the circumferential direction of the main rib.

5. The battery pack according to claim 2,
wherein an outer diameter of the main rib is smaller than an inner diameter of the insert hole.

6. The battery pack according to claim 5,
wherein when the fixing protrusion is fitted into the insert hole, the deformable rib is deformed in at least one of horizontal and vertical directions of the battery module to fill a gap between the main rib and the insert hole.

7. The battery pack according to claim 2,
wherein the deformable rib is elongated along a length direction of the main rib.

8. The battery pack according to claim 2,
wherein the main rib has a circular or oval section.

9. The battery pack according to claim 1,
wherein the insert hole is provided in plural, and
wherein the fixing protrusion is provided in a number corresponding to the number of the plurality of insert holes.

10. A vehicle, comprising a battery pack defined in claim 1.

* * * * *